United States Patent [19]

Krauja et al.

[11] Patent Number: 4,721,081
[45] Date of Patent: Jan. 26, 1988

[54] FLAME INCUBATING AND PROPAGATING APPARATUS FOR A FUEL COMBUSTION SYSTEM

[75] Inventors: Ziedonis I. Krauja, East Peoria; Jeffrey J. Krieger; Scott F. Shafer, both of Peoria; Craig A. Kroeger, East Peoria, all of Ill.

[73] Assignee: Caterpillar Inc., Peoria, Ill.

[21] Appl. No.: 870,266

[22] Filed: Jun. 3, 1986

[51] Int. Cl.⁴ ............................................. F02M 61/14
[52] U.S. Cl. ...................................... 123/298; 123/279
[58] Field of Search .................................. 123/298, 279

[56] References Cited

U.S. PATENT DOCUMENTS

| | | | |
|---|---|---|---|
| 920,989 | 5/1909 | Ostergren | 123/298 |
| 971,954 | 10/1910 | Wygodsky | 123/298 |
| 1,341,478 | 5/1920 | Platt | 123/298 |
| 1,362,210 | 12/1920 | Wheeler | 123/298 |
| 2,058,487 | 10/1936 | Mock | 123/298 |
| 3,244,159 | 4/1966 | Meurer | 123/32 |
| 4,091,774 | 5/1978 | Kamiya | 123/32 ST |
| 4,187,825 | 2/1980 | Loyd | 123/298 |
| 4,206,725 | 6/1980 | Jenkel et al. | 123/32 R |
| 4,275,844 | 6/1981 | Grgurich et al. | 239/533.3 |
| 4,286,557 | 9/1981 | Klomp | 123/298 |
| 4,361,122 | 11/1982 | Latsch | 123/266 |
| 4,444,166 | 4/1984 | Kovacs | 123/298 |
| 4,548,172 | 10/1985 | Bailey | 123/298 |

FOREIGN PATENT DOCUMENTS

| | | | |
|---|---|---|---|
| 1804383 | 7/1970 | Fed. Rep. of Germany | 123/298 |
| 44389 | 6/1916 | Sweden | 123/298 |
| 966534 | 8/1964 | United Kingdom | 123/298 |
| 1062174 | 3/1967 | United Kingdom | 123/298 |

OTHER PUBLICATIONS

Cat 3300 Series Engines—Heavy-Duty, Dependable Power; Publication No. LECH3207; published: 1983.

Primary Examiner—Ronald B. Cox
Attorney, Agent, or Firm—Anthony N. Woloch

[57] ABSTRACT

Conventional direct-injection internal combustion engines having a fuel injector with multiple fuel spray orifices will not completely ignite and burn relatively lower-cetane-number alternative fuels such as 100 percent methanol or ethanol. That is because the fuel spray injection pattern, per se, usually cannot carry or propagate a flame to all the injected fuel which is typically made up of individual fuel streams which are separated by sectors of fuel-deficient intake air. The present fuel combustion system (10) includes a multiple-orifice fuel injector (22), a baffle (138) having a concave surface (146), and a fuel ignition-initiating device (22) such as glow plug positioned generally in spaced relation between the fuel injector (22) and the concave surface (146). The baffle (138) intercepts and temporarily maintains a stoichiometric preselected portion (34,38) of at least one, and preferably two, fuel streams (102,106) in ignitable proximity to the fuel ignition-initiating device (26) to positively start a localized flame (42) of burning fuel. The baffle (138) controlledly reflects and rapidly directs the resultant expanding flame (42) of burning fuel to all of the remaining fuel streams (110) so that they are interconnectedly bridged with the flame (42) and thereby positively ignited.

21 Claims, 9 Drawing Figures

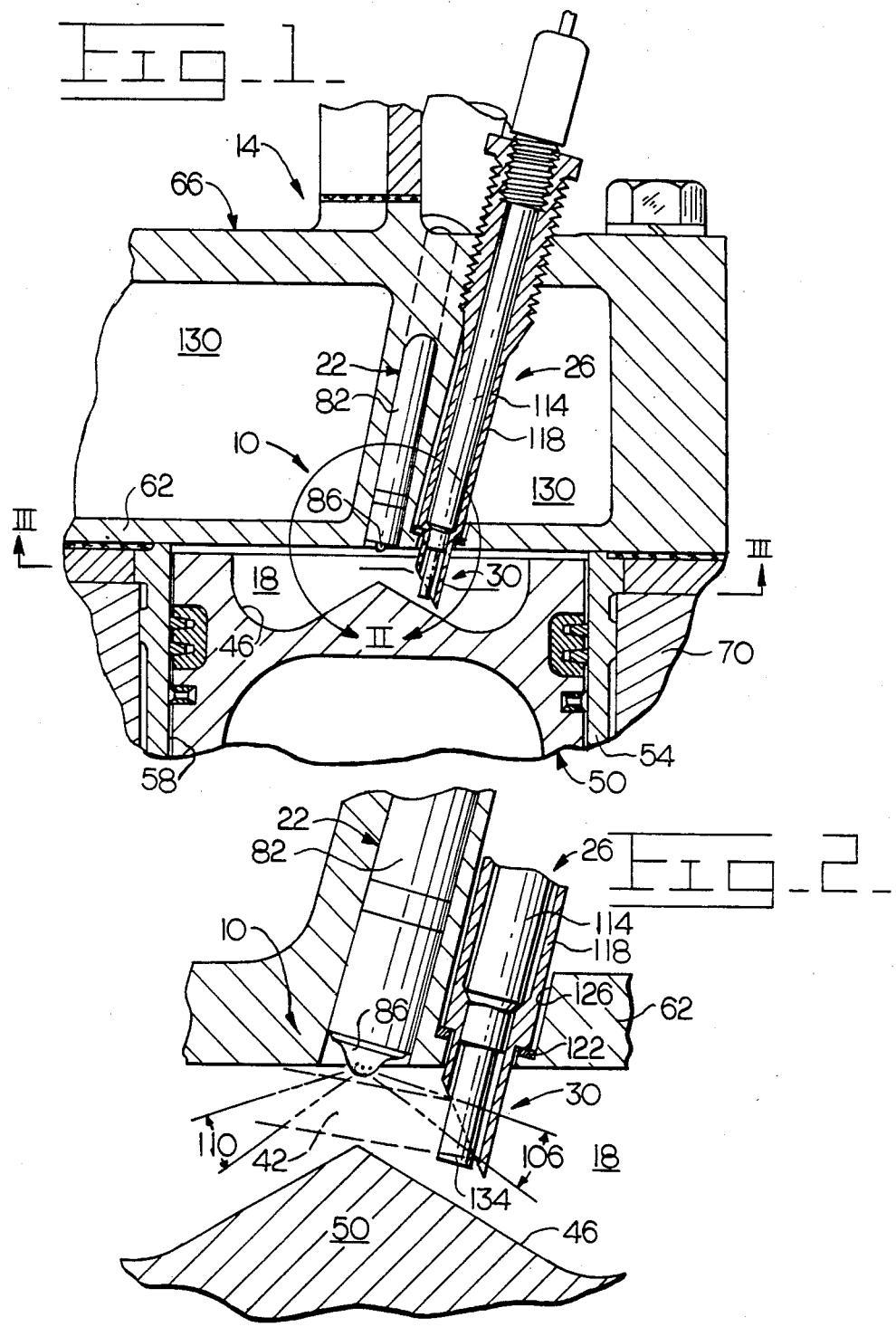

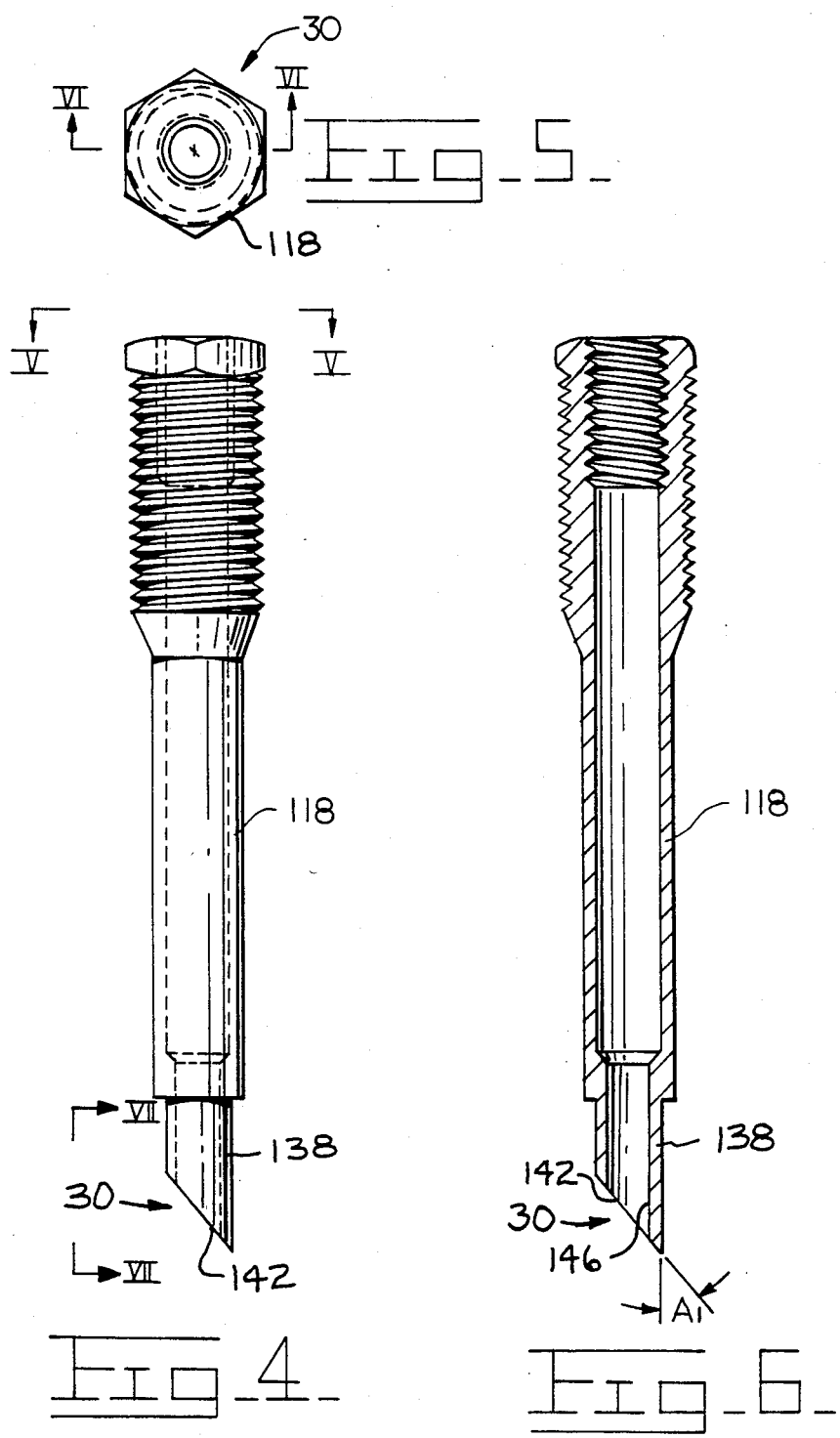

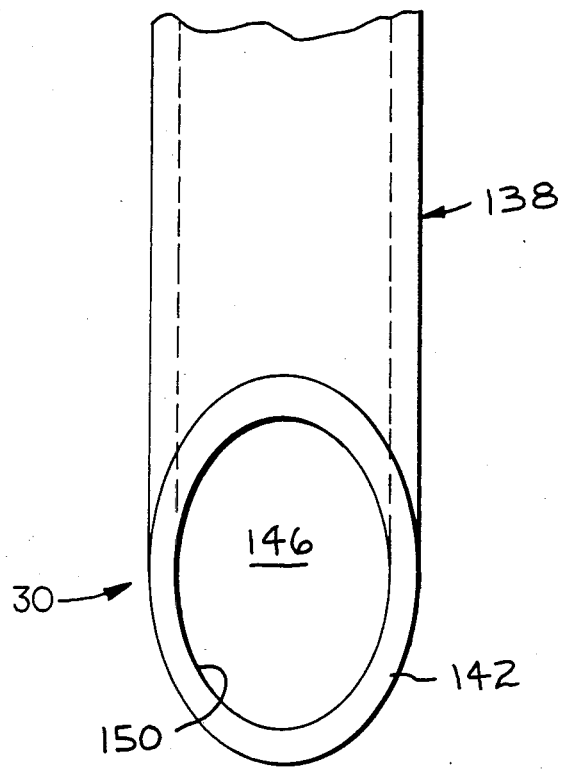

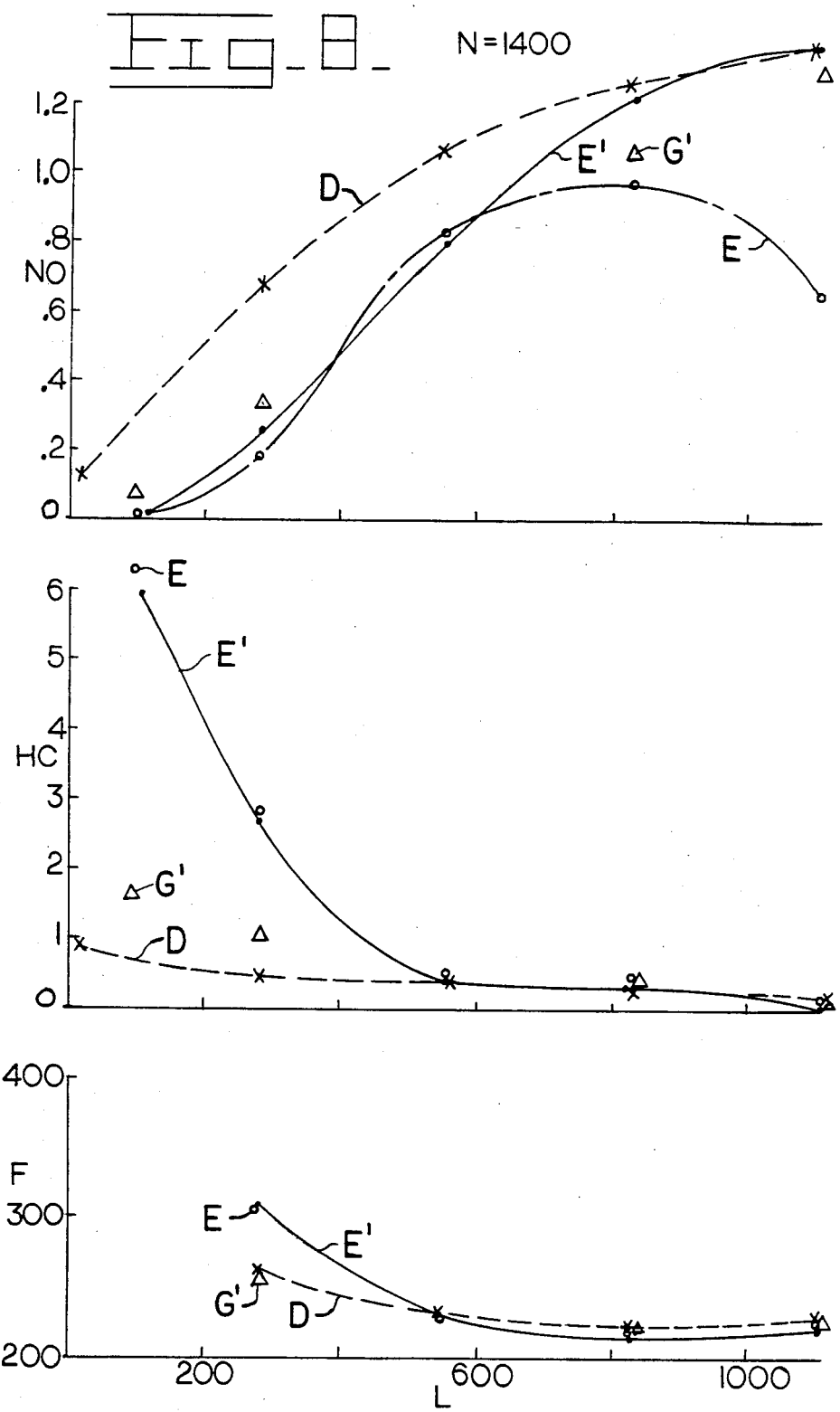
Fig. 8 N=1400

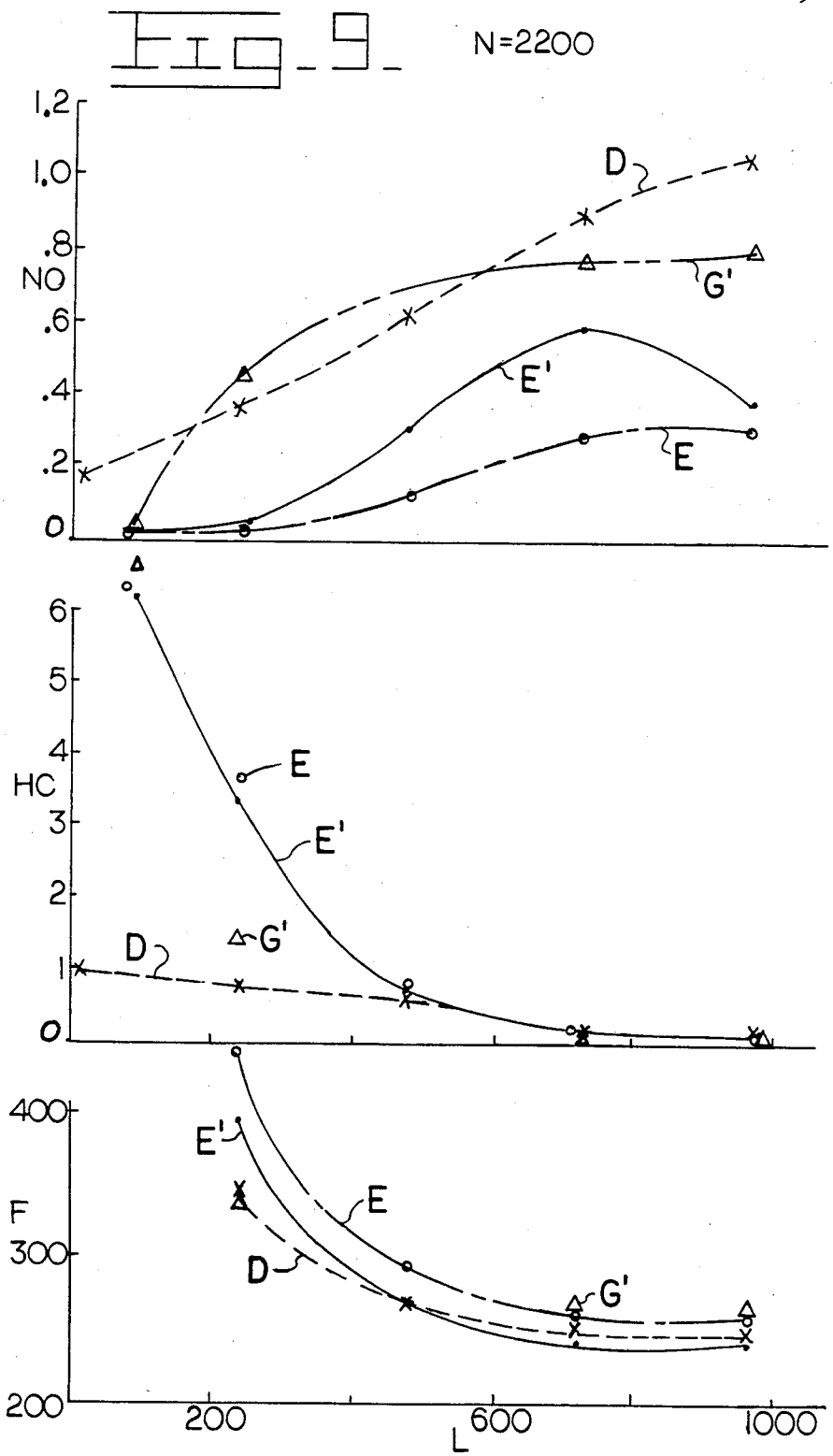
Fig. 9 N=2200

FLAME INCUBATING AND PROPAGATING APPARATUS FOR A FUEL COMBUSTION SYSTEM

TECHNICAL FIELD

This invention relates to a fuel combustion system for a direct-injection internal combustion engine and, more particularly, to such a fuel combustion system adapted to efficiently ignite and burn non-autoignitable fuels such as ethanol or methanol as well as autoignitable fuels such as traditional diesel fuel.

BACKGROUND ART

In view of dwindling supplies of traditional diesel fuels, it would be very advantageous if conventional compression-ignition engines, more particularly direct-fuel-injection types, could be easily and inexpensively adapted to burn not only such diesel fuels but also alternative fuels such as 100 percent methanol or ethanol. Such alternative fuels are regarded as attractive substitutes for traditional diesel fuels because methanol can be feasibly sythesized from a wide variety of substances such as coal, natural gas, wood or animal waste. Moreover, ethanol can be feasibly produced by fermentation of starch derived from widely grown plants such as sugar cane or corn. Furthermore, the amounts of nitrogen oxides and smoke-associated particulates are inherently lower and practically nonexistent, respectively, when burning such alcohol fuels as compared to burning traditional diesel fuels.

However, these alternative fuels are characterized by a cetane number or ignition value on the order of about 0-10 whereas traditional diesel fuels, such as Grade 2-D diesel fuel, are characterized by a cetane number of at least 40. Consequently, unlike traditional diesel fuels, these relatively lower-cetane-number alternative fuels do not readily autoignite under normal compression ratios and temperatures of about 538° C. (1000° F.), in an open combustion chamber of a compression-ignition engine, merely by contacting and mixing with intake air which has been compressed and thereby heated by a piston.

Such relatively lower-cetane-number alternative fuels can be locally ignited with the aid of an electrically-energized glow plug or spark plug which directly heats a nearby air/fuel mixture to a sufficiently elevated temperature of about 1000° C. (1832° F.). However, another major problem exists of completely igniting and burning all of the alternative fuel that is directly injected into the open combustion chamber. This problem is due to the way fuel has been typically directly injected into the open combustion chamber of a modern compression-ignition engine.

As shown in U.S. Pat. No. 4,275,844 issued to Grgurich et al. on June 30, 1981, a conventional open combustion chamber of a direct-injection compression-ignition engine typically includes a relatively-high-pressure fuel injector having a plurality of very small fuel spray orifices. These orifices periodically and simultaneously spray a plurality of distinct and evenly spaced high pressure fuel streams towards various peripheral portions of the open combustion chamber which is already filled with fresh intake air. This pattern of relatively concentrated conical fuel streams separated by sectors of fuel-deficient intake air, similar to the radial spokes of a wheel, is desirable for modern direct-injection engines to provide each fuel stream without enough kinetic energy so that it can quickly and adequately penetrate, atomize, mix, and combust with the required larger amounts of intake air before each cyclic power stroke of the open combustion chamber has substantially begun.

If a glow plug or spark plug is electrically-energized to produce a localized elevated temperature of about 1000° C. (1832° F.) and is positioned in close enough proximity to one of the mutually-spaced fuel streams of relatively lower-cetane-number alternative fuel, usually only that one fuel stream and other sufficiently close fuel streams will ignite. However, the fuel-deficient sectors of air separating each of the other remotely spaced fuel streams will prevent the flame from propagating to those other fuel streams. Consequently, the fuel streams which are not ignited, or are only partially burned, are exhausted from the open combustion chamber as either wasted raw fuel or imcompletely combusted fuel. This, of course, signficantly and undesirably reduces the fuel economy and power output of the engine and raises the level of noxious emissions, particularly hydrocarbons, exhausted from the open combustion chamber. Only at high engine loads is the combustion system less dependent on flame propagation for complete ignition because, under such conditions, the initial pressure rise and associated temperature rise may be sufficiently high to force autoignition of the remote fuel streams.

In U.S. Pat. No. 3,244,159 issued to Meurer on Apr. 5, 1966, there is disclosed a fuel combustion system fashioned in such a way that an intensive swirling or unidirectional gas flow results in the combustion chamber during engine operation. A localized flame of burning fuel is started on a fuel stream injected adjacent to an igniting element and the flame and air/fuel mixture is moved along by that intensive swirling gas flow so that the flame contacts and ignites other injected fuel streams. However, the complete dependence upon swirling gas flow to achieve propagation of a flame through a non-autoignitable fuel carries the penalty of lower fuel economy due to increase heat rejection (i.e., the swirling gas flow disrupts the insulating gas boundary layer on the combustion chamber walls). Moreover, modifications, for example, to the air intake port(s) or to the air intake valve(s) for inducing intensive swirling gas flow also undesirably create gas flow restrictions which increase pumping losses of the engine and thereby further lower fuel economy.

In U.S. Pat. No. 4,548,172 issued to Bailey on Oct. 22, 1985, there is shown a fuel combustion system including a multiple-orifice fuel injector, a fuel ignition-initiating means, a secondary fuel spray orifice, and an impingement surface element having a deflecting face spaced from and facing that secondary orifice. During engine operation, this arrangement effectively generates an auxiliary cloud of atomized fuel which interconnectedly bridges other mutually-spaced fuel streams so a flame can be rapidly propagated without depending on the existence of swirling gas flow. However, at above about one quarter to one half engine loads, such an arrangement may produce excessive smoke when burning non-oxygenated fuels such as diesel fuel or unleaded gasoline, respectively. That is because the size of the secondary orifice is usually chosen in accordance with ensuring satisfactory engine operation at light engine loads and therefor the size of the secondary orifice may be somewhat too large for spraying non-oxygenated fuels when the engine is operated at heavy loads. Consequently, at heavy engine loads, too much non-oxygenated fuel may be sprayed through the secondary orifice such that the fuel is unable to adequately mix and combust with air. Furthermore, the above arrangement may require special modifications to standard off-the-shelf fuel injectors and/or pistons which add to the cost of the engine.

The present invention is directed to overcoming one or more of the problems as set forth above.

DISCLOSURE OF THE INVENTION

In one aspect of the present invention, an improved fuel combustion system for a direct-injection internal combustion engine is disclosed having a fuel ignition-initiating means for initiating localized ignition and flaming of a respective fuel stream sprayed during engine operation from a selected fuel spray orifice of a multiple-orifice fuel injector. The system further includes a baffle means for intercepting and temporarily maintaining a preselected portion of the respective fuel stream within ignitable proximity to the fuel ignition-initiating means. Consequently, the baffle means helps start a localized flame of burning fuel and then controlledly directs the resultant expanding flame of burning fuel to all of the other fuel streams sprayed from the fuel injector so that they are interconnectedly bridged with the flame and thereby positively ignited.

In another aspect of the present invention, an improved fuel combustion system for a direct-injection internal combustion engine is disclosed having a fuel ignition-initiating means for initiating localized ignition and flaming of a respective pair of fuel streams sprayed during engine operation from a selected pair of fuel spray orifices of a multiple-orifice fuel injector. The system further includes a baffle means for intercepting a preselected portion of each of the respective pair of fuel streams and then temporarily maintaining, in cooperation with the respective pair of fuel streams, the intercepted portions of fuel within ignitable proximity to the fuel ignition-initiating means. Consequently, the baffle means helps start a localized flame of burning fuel and then controlledly directs the resultant expanding flame of burning fuel to all of the other fuel streams sprayed from the fuel injector so that they are interconnectedly bridged with the flame and thereby positively ignited.

There is a growing need to easily and inexpensively modify conventional direct-injection internal combustion engines so that they can efficiently burn more plentiful alternative fuels such as 100 percent methanol or ethanol. The baffle means of the present invention facilitates the initiation of a localized flame of burning fuel and also helps prevent fuel or gases from undesirably cooling the fuel ignition-initiating means during engine operation. Moreover, the baffle means focuses and directs the resultant expanding flame to all of the other fuel streams to ensure complete and rapid combustion during each relatively brief combustion stroke.

The results of actual tests in direct-injection compression-ignition engines show that this improved fuel combustion system burning such alternative fuels exhibits about the same or even lower adjusted rate of fuel consumption as the conventional open combustion system burning traditional diesel fuel. Moreover, when this improved fuel combustion system burned 100 percent alternative fuels under most engine operating conditions, it produced about the same or even a lower level of nitrogen oxide emissions than that produced by a conventional open combustion system burning traditional diesel fuel.

BRIEF DESCRIPTION OF THE DRAWINGS

FIG. 1 is a diagrammatic partial cross-sectional side elevational view of one embodiment of the improved fuel combustion system as incorporated in a direct-injection internal combustion engine viewed from the rear end portion;

FIG. 2 is a diagrammatic enlarged partial view of FIG. 1 taken within the area encircled by line II of FIG. 1;

FIG. 4 is a diagrammatic enlarged view of an adapter shown in FIGS. 1 and 2;

FIG. 5 is a diagrammatic plan view taken along line V—V of FIG. 4;

FIG. 6 is a diagrammatic cross-sectional view taken along line VI—VI of FIG. 5;

FIG. 7 is a diagrammatic enlarged partial view taken along line VII—VII of FIG. 4;

FIG. 8 is a graph which approximately shows the comparative results of actual laboratory engine tests which measured the amounts of noxious emissions and adjusted fuel comsumption as a function of varying engine load. These tests were run at a constant engine speed of about 1400 revolutions per minute (rpm); and FIG. 9 is a graph similar to FIG. 8 but approximately showing the results of similar tests run at a higher constant engine speed of about 2200 rpm.

BEST MODE FOR CARRYING OUT THE INVENTION

Figure 3:
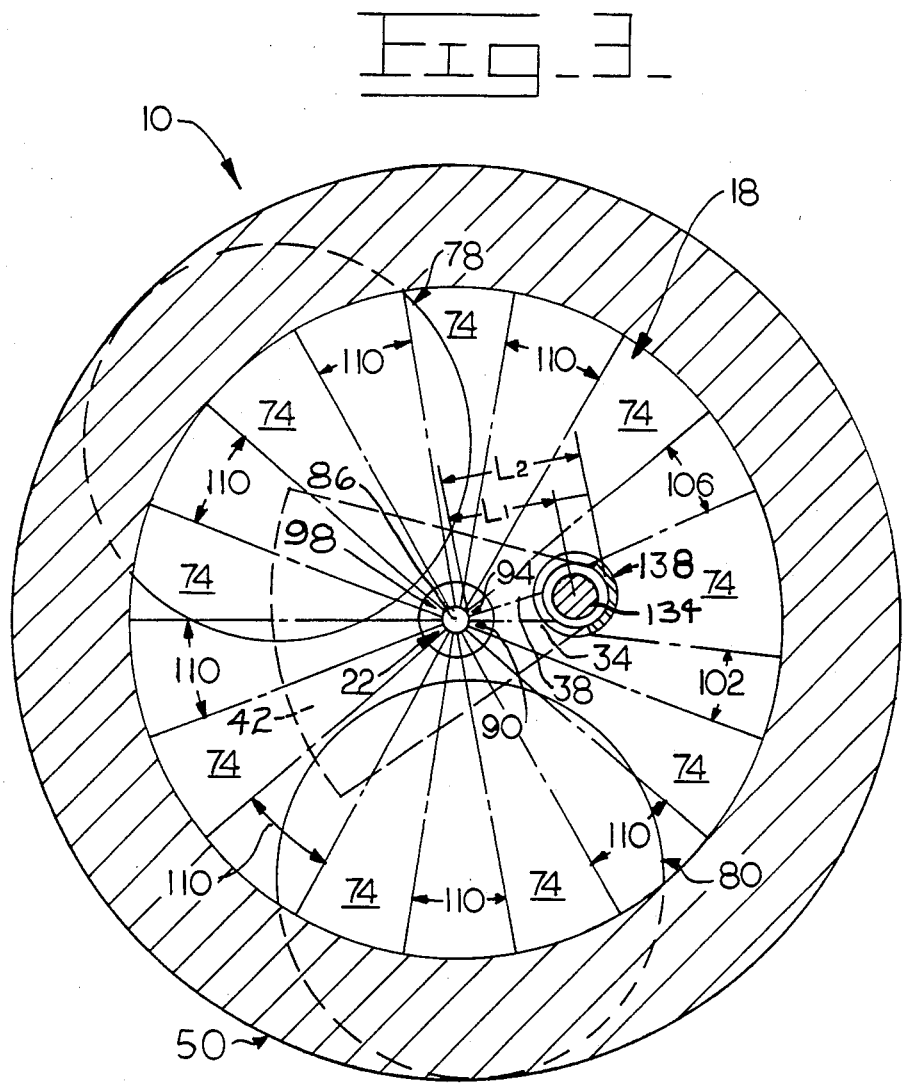
FIG. 3 is a diagrammatic partial view taken along line III—III of FIG. 1.

Referring to FIGS. 1-7 wherein similar references characters designate similar elements or features throughout those figures, there is shown one embodiment of the improved fuel combustion system of the present invention.

In FIGS. 1-3, an improved fuel combustion system 10 is shown as incorporated in a direct-injection internal combustion engine 14 (FIG. 1). For example, the engine 14 may have originally been a conventional compression-ignition engine which has been inexpensively and easily modified as described below. The fuel combustion system 10 includes an open combustion chamber 18; only a single fuel injector 22; a fuel ignition-initiating means or device 26 for initiating localized ignition and flaming of fuel injected into the open combustion chamber 18; and a unique baffle means 30 for intercepting a preselected portion 34,38 (FIG. 3) of such injected fuel, for temporarily maintaining that intercepted portion 34,38 of fuel within ignitable proximity to the fuel ignition-initiating means 26 in order to start an initially-localized flame 42 of burning fuel, and for controlledly reflecting and directing the resultant expanding flame 42 of burning fuel to all of the other portion(s) of the injected fuel so that it is interconnectedly bridged with the flame and thereby positively ignited.

As defined herein, the open combustion chamber 18 incorporates no flow restrictions that are sufficiently small to cause large differences in gas pressure between the different parts of the open combustion chamber during the combustion process. The open combustion chamber 18 is defined mainly by, for example, a conventional Mexican-hat-shaped crater wall 46 (FIG. 1) of an axially-reciprocable piston 50, shown at about the top dead center position of its periodic compression stroke, a stationary cylinder liner 54 having a cylindrical bore 58 in which the piston 50 reciprocates, and a bottom deck 62 of a cylinder head 66 which clamps the cylinder liner 54 to an engine block 70. Preferably, the open combustion chamber 18 is of the quiescent type so that the motion of gases therein is substantially random instead of being unidirectional or otherwise ordered. The quiescent type of open combustion chamber is preferably chosen because it provides a minimal level of turbulence and heat transfer which helps achieve low specific fuel consumption. The reference numbers 74 in FIG. 3 indicate fresh intake air which is periodically admitted into the open combustion chamber by one or more intake poppet valves 78 and, following combustion, is discharged by one or more exhaust poppet valves 80.

The fuel injector 22 may be, for example, a conventional fuel injection nozzle or a unit fuel pump injector and includes an elongated injector body 82 (FIGS. 1-2) extending through a bore in the cylinder head 66. For properly orienting the directions of its fuel injecion sprays, the fuel injector 22 may be accurately secured to the cylinder head 66, for example, by a clamping arrangement as described in U.S. Pat. No. 4,206,725 issued to Jenkel et al. on June 10, 1980. Connected to one end portion of the injector body 82 is a partly semi-spherical nozzle tip 86 (FIGS. 1-3) which preferably projects directly into a central portion of the open combustion chamber 18. The nozzle tip 86 includes a plurality of evenly spaced fuel spray orifices 90,94,98 (FIG. 3), positioned circumferentially in a common horizontal plane, which are adapted during engine operation to simultaneously spray distinct and evenly spaced conical fuel streams 102,106,110 generally radially outwardly towards outer peripheral portions of the open combustion chamber 18. For a quiescent open combustion chamber, the plurality of fuel spray orifices preferably total at least five and, for example, total nine evenly-space fuel spray orifices in FIG. 3. As apparent from FIG. 3, each of the fuel streams 102,106,110 has an imaginary centerline axis, coincident with the centerline axis of each respective fuel spray orifice, and all of the fuel streams are mutually separated by fuel-deficient sectors 74 of the intake air.

In FIGS. 1-3, the fuel ignition-initiating means 26 is shown, for example, as mainly including an elongated and electrically-energizable glow plug 114 which is directly and threadedly connected inside a generally cylindrical and hollow adapter 118 that is threadedly connected to or otherwise supported in another bore of the cylinder head 66. As shown in FIG. 1, the adapter 118 extends completely through the cylinder head 66 and is seated against an annular seal 122 disposed in a counterbore 126 of the bottom deck 62. The adapter 118 and the seal 122 which, for example, may be made of stainless steel and copper-bronze alloy, respectively, function to protect the glow plug 114 from directly contacting liquid coolant which is circulated during engine operation through internal chambers 130 of the cylinder head 66. Alternatively, in lieu of providing the adaptor 118, the cylinder head 66 may be provided with a cast-in or otherwise integral boss having a bore directly through which the glow plug 114 extends to seat against the seal 122.

At a free end of the glow plug 114 is an electrical resistance element 134 (FIGS. 2-3) of, for example, circular or generally rectangular cross-section which also projects directly into the central portion of the open combustion chamber 18 so that it is unobstructively spaced a preselected distance $L_1$ (FIG. 3) from at least one, and preferably a pair of, selected fuel spray orifices 90,94 of the nozzle tip 86. Moreover, the fuel ignition-initiating means 26 is positioned in spaced relation between the centerline axes of the pathways of the respective pair of adjacent fuel streams 102,106 in order to avoid cooling of the electrical resistance element 134 and to avoid cracking of fuel caused by direct surface impingement thereon of the relatively dense portions of those fuel streams 102,106.

Alternatively, the fuel ignition-initiating means 26 may mainly include, instead of the glow plug 114, an electrically-energizable spark plug or some other high energy device which, during engine operation, can be continuously or intermittently energized to locally heat the nearby fuel to a predetermined and elevated fuel igniting temperature that is sufficient to start ignition of the relatively lower-cetane-number alternative fuel. If a spark plug is substituted for the glow plug 114, the reference number 134 would refer to an electrode element of the spark plug.

The baffle means 30 is preferably a rigid baffle 138 (FIGS. 3, 4, 6, 7) which, for example, is formed as an integral extension of one end portion of the adapter 118. Alternatively, the baffle 138 may be formed as an integral extension of the body of the glow plug 114 when an integral boss of the cylinder head 66 is used to directly mount the glow plug 114 in lieu of the adapter 118. As another alternative, the baffle 138 may be formed as an integral extension of the seal 122 whether or not the adapter 118 is used. As another alternative, the baffle 138 may be connected to the bottom deck 62 of the cylinder head 66. The baffle 138 projects directly into the open combustion chamber 18 and preferably includes a tubular and beveled end portion 142 positioned in generally concentrically spaced relation partially around the electrical resistance element 134. The interior of the beveled end portion 142 defines an imperforate and generally semi-cylindrical concave surface 146. The concave surface 146 generally faces and is spaced from the selected pair of adjacent fuel spray orifices 90,94 according to a second preselected distance $L_2$ which is greater than the first preselected distance $L_1$ so that the fuel ignition-initiating means 26 is positioned in spaced relation directly between the selected pair of adjacent fuel spray orifices 90,94 of the fuel injector 22 and the concave surface 146 of the baffle 138.

As shown in FIGS. 5-7, the free end of the beveled end portion 142 forms an angle, $A_1$, relative to a longitudinal axis of the baffle 138 in order to define a single and generally oblong opening 150. The size and orientation of the opening 150 is chosen so that it is sufficiently large enough to unobstructively expose the concave surface 146 generally towards both the selected pair of fuel spray orifices 90,94 and all of the pathways of the other fuel streams 110 sprayed from the fuel injector 22 during engine operation. Generally, for a given fuel stream pattern and inside diameter of the beveled end portion as illustrated, the magnitude of the angle, $A_1$, will decrease as the orientation of the longitudinal axis of the electrical resistance element 134 is chosen to be more vertical relative to the horizontal plane of the fuel spray orifices 90,94,98. Similarly, the magnitude of the angle, $A_1$, will increase as the orientation of the longitudinal axis of the electrical resistance element 134 is chosen to be more horizontal relative to the horizontal plane of the fuel spray orifices. The maximum size of the concave surface 146 is chosen so that the concave surface intercepts less than one half, and preferably about one third, of the total stoichiometric volume of air/fuel mixture of each of the selected pair of adjacent fuel streams 102,106 sprayed from the selected pair of fuel spray orifices 90,94 during engine operation. The minimum outer surface area of the beveled end portion 142 is preferably chosen so that the beveled end portion can partially shield the fuel ignition-initiating means 26 from being cooled during engine operation by gases 74 moving randomly in the open combustion chamber 18.

As shown in FIG. 5, the end portion of the adapter 118 opposite to the beveled end portion 142 is preferably provided with a reference mark (not shown) to visually verify, during assembly, proper alignment between the concave surface 146 of the baffle 138 and the selected fuel spray orifices 90,94 of the fuel injector 22. If the baffle 138 is, alternatively, formed as an integral extension of the seal 122, a complementary tongue and groove arrangement may be formed between the seal 122 and the counterbore 126 of the bottom deck 62 for ensuring proper alignment of the concave surface 146.

INDUSTRIAL APPLICABILITY

By provision of the improved fuel combustion system 10 of the present invention, a localized flame 42 of burning fuel initiated by the fuel ignition-initiating means 26 is rapidly and completely propagated to all of the fuel which is directly injected into the open combustion chamber 18.

Periodically, as the reciprocating piston 50 approaches the top dead center position of its compression stroke, relatively high pressure fuel is simultaneously injected generally radially outwardly into the open combustion chamber 18 through all of the fuel spray orifices 90,94,98 of the fuel injector 22. The injected fuel sprayed from the fuel spray orifices 90,94,98 form generally conically-shaped and mutually-spaced fuel streams 102,106,110 which penetrate through and atomize with the quiescent intake air 74. The extent of penetration by the fuel streams directly varies with the amount of engine load so that, at about full engine load, the fuel streams 102,106,110 generally reach the outer peripheral portions of the open combustion chamber 18 as illustrated in FIG. 3.

A preselected outer portion 34,38 of each respective fuel stream 102,106 sprayed from the selected fuel spray orifices 90,94 is intercepted by the concave surface 146 of the baffle 138. An outer portion of each respective fuel stream 102,106 is chosen to be intercepted by the concave surface 146 because each outer portion exhibits stoichiometric proportions of well-mixed fuel and air 74. The concave surface 146 controlledly deflects the intercepted portions 34,38 of fuel to intercept or collide with one another in the otherwise stagnated semi-annular space between the fuel ignition-initiating means 26 and the concave surface 146. The concave surface 146 of the baffle 138, in cooperation with the respective pair of adjacent fuel streams 102,106 and the fuel ignition-initiating means 26, temporarily confines and maintains those intercepted portions 34,38 of fuel as a stagnated atmosphere within ignitable proximity to the fuel ignition-initiating means 26.

The fuel ignition-initiating means 26 is either intermittently or continuously energized during engine operation. If the fuel ignition-initiating means 26 includes a glow plug 114, the glow plug is electrically energized and its electrical resistance element 134 is thereby heated to a preselected elevated temperature. The electrical resistance element 134 positively ignites the intercepted and temporarily confined portions 34,38 of well-atomized fuel without being significantly cooled by direct surface impingement of the relatively dense fuel streams 102,106 or random gas motion. The volume of the semi-annular space is preferably chosen only large enough to accumulate enough intercepted air/fuel mixture so that the resultant flame 42 of burning fuel will expand, for example, by about 50 to 500 times that volume depending upon engine load. Consequently, the expanding flame 42 is controlledly reflected by the concave surface 146 and/or directed through the oblong opening 150 of the baffle 138 to all of the other fuel streams 110 so that they are interconnectedly bridged with the flame 42 and thereby positively and rapidly ignited.

The baffle means 30 is easily and inexpensively manufactured as an integral extension of the adapter 118, or the fuel ignition-initiating means 26, or the seal 122. Another advantage of providing the baffle means 30 is that it helps prolong the life of the fuel ignition-initiating means 26 when a glow plug 114 is used. That is because the glow plug requires, for example, about one ampere less of electrical current to maintain a sufficiently elevated fuel igniting temperature when the glow plug is partially shielded by the baffle means 30 from gas cooling. Moreover, direct fuel impingement upon the fuel ignition-initiating means for ignition is avoided which prevents undesirable cracking of fuel and resultant excessive smoke and noxious emissions, particularly with non-oxygenated hydrocarbon fuels.

FIGS. 8 and 9 represent approximate results of actual laboratory tests on modified and unmodified Caterpillar 3300 Series turbocharged engines. FIGS. 8 and 9 compare the rate of fuel consumption and amounts of noxious emissions produced by the embodiment illustrated in FIGS. 1–7 of the present invention, burning 100 percent ethanol (E') or unleaded gasoline (G'), with a conventional fuel combustion system burning traditional Grade 2-D diesel fuel (D), and also with a fuel combustion system illustrated in FIGS. 1–3 of U.S. Pat. No. 4,548,172 burning 100 percent ethanol (E). All of the engines had a cylinder bore diameter of about 121 millimeters (4.75 inches) and a piston stroke of about 152 millimeters (6.00 inches); however, the engine tests burning diesel fuel (D) utilized an in-line six cylinder engine whereas all the other engine tests burning ethanol (E,E') or unleaded gasoline (G') utilized a single-cylinder engine. The conventional fuel combustion chamber burning diesel fuel basically differed from the illustrated embodiment of the present invention in that it had neither a fuel ignition-initiating means 26 nor a baffle means 30.

Various exemplary parameters of the illustrated and actually tested embodiment of the present invention for burning 100 percent ethanol or unleaded gasoline were approximately as follows (in some cases the parameters varied over an approximate range according to engine load):

| | |
|---|---|
| glow plug fuel-igniting temperature | 700–1000° C. (1291–1832° F.) |
| number of fuel spray orifices | nine (equally spaced) |
| diameter of each fuel spray orifice | 0.207 mm (0.0081 in.) |
| fuel injection pressure | 28,000–69,000 kPa (4000–10,000 psi) |

| -continued | |
|---|---|
| duration of fuel injection | 30–50° of crankshaft rotation |
| angle between centerline axis of each fuel stream and bottom deck of cylinder head | 17.5° |
| compression ratio | 15:1 |
| peak cylinder pressure | 10,340 kPa (1500 psi) |
| glow plug element cross section | 3.8 × 4.7 mm (0.15–0.19 in.) |
| distance, $L_1$ | 16 mm (0.63 in.) |
| length that glow plug element and baffle project below bottom deck of cylinder head | 13 mm (0.51 in.) |
| inside diameter of beveled end portion of baffle | 6.6 mm (0.26 in.) |
| distance, $L_2$ | 19 mm (0.75 in.) |
| average distance between glow plug element and concave surface of baffle | 1.1 mm (0.043 in.) |
| angle, $A_1$ of beveled end portion | 40° |
| angle between glow plug element/baffle axis and vertical axis | 15° |
| angle between baffle axis and centerline axis of respective fuel streams | 75° |

In both FIGS. 8 and 9, the amounts of brake specific nitrogen oxide (NO), brake specific hydrocarbons (HC), and brake specific fuel consumption (F) are plotted as a function of varying engine load (L) at an approximately constant engine speed (N). The amounts of nitrogen oxide (NO) and hydrocarbons (HC) produced by the engines are measured in units of parts per million divided by one thousand (1000). The amount of brake specific fuel consumption (F) is measured in units of grams per kilowatt-hour; however, the fuel consumption results (F) for ethanol (E,E′) and unleaded gasoline (G′) are downwardly adjusted as if the energy content per gram of these fuels were the same as the actually higher energy content per gram of diesel fuel (D). The amount of varying engine load (L) is measured in terms of brake means effective pressure and is expressed in units of kilopascals. In FIG. 8, the tests were run at a constant engine speed (N) of about 1400 revolutions per minute (rpm) which represents the peak torque speed of the engines whereas the tests of FIG. 9 were run at a constant engine speed (N) of about 2200 rpm which represents the rated speed of the engines.

From FIGS. 8 and 9, it is observed that the fuel combustion system 10 of the present invention burning 100 percent ethanol (E′) or unleaded gasoline (G′) efficiently combusts such fuel at about the same or even a lower adjusted rate of fuel consumption per kilowatt-hour produced as the conventional fuel combustion chamber engine burning diesel fuel (D). Of course, generally in any fuel combustion system, the amount of nitrogen oxide (NO) produced by alcohols such as ethanol are naturally expected to be advantageously lower than that produced by diesel fuels (D). Similarly, while not illustrated in either FIGS. 8 or 9, generally in any fuel combustion system, the amount of smoke-associated particulates produced by alcohols such as ethanol are naturally expected to be practically nonexistent as compared to the amount of smoke-associated particulates produced by diesel fuels (D). At low engine loads, the baseline diesel engine produced the lowest amounts of hydrocarbon (HC) emissions.

The low level of nitrogen oxide emissions and generally excellent level of fuel consumption for a given power output, particularly at higher engine loads, highlights the effectiveness of the present invention. Without the addition of the fuel ignition-initiating means 26 and the baffle means 30, a significant amount of such alternative fuel injected into a conventional open combustion chamber would not be ignited or would not burn completely, resulting in either much less engine power output, higher fuel consumption, and higher noxious hydrocarbon (HC) emissions or even total inoperability of the engine.

Other aspects, objects, and advantages of this invention can be obtained from a study of the drawings, the disclosure, and the appended claims.

We claim:

1. A fuel combustion system for a direct-injection internal combustion engine including an open combustion chamber, a plurality of fuel spray orifices each having a centerline axis directed outwardly into the open combustion chamber, comprising:

a fuel ignition-initiating means projecting directly into the open combustion chamber and spaced a preselected distance from a selected fuel spray orifice and also spaced from the centerline axis of the selected fuel spray orifice; and baffle means for intercepting a preselected portion of a respective fuel stream spray from the selected fuel spray orifice during engine operation, for temporarily confining and maintaining that intercepted portion of fuel within ignitable proximity to the fuel ignition-initiating means until an initially-localized flame of burning fuel is started, and for controlledly directing the resultant expanding flame of burning fuel to all of the other fuel streams sprayed from the other fuel spray orifices, said baffle means being positioned in spaced relation partially around said fuel ignition-initiating means.

2. A fuel combustion system for a direct-injection internal combustion engine including an open combustion chamber, a plurality of fuel spray orifice each having a centerline axis directed outwardly into the open combustion chamber, comprising:

a fuel ignition-initiating means projecting directly into the open combustion chamber and spaced a preselected distance from a selected fuel spray orifice and also spaced from the centerline axis of the selected fuel spray orifice; and baffle means for intercepting a preselected portion of a respective fuel stream sprayed from the selected fuel spray orifice during engine operation, for temporarily maintaining that intercepted portion of fuel within ignition proximity to the fuel ignition-initiating means until an initially-localized flame of burning fuel is started, and for controlledly directing the resultant expanding flame of burning fuel to all of the other fuel streams sprayed from the other fuel spray orifices, wherein the baffle means is a baffle positioned in the open combustion chamber and having a generally concave and imperforate surface generally facing and spaced from the selected fuel spray orifice according to a second preselected distance which is greater than the first selected distance with the fuel ignition-initiating means being positioned in spaced relation generally between the selected fuel spray orifice and the concave surface of the baffle.

3. A fuel combustion system (10) for a direct-injection internal combustion engine (14) including a substantially quiescent open combustion chamber (18) adapted during engine operation to be substantially free of ordered motion of gases (74) periodically admitted thereto, a fuel injector (22) having at least three fuel spray orifices (90,94,98) projecting directly into the open combustion chamber (18) and adapted during engine operation to simultaneously spray distinct and mutually-spaced fuel streams (102,106,110) generally outwardly towards peripheral portions of the open combustion chamber (18), comprising:

fuel ignition-initiating means (26) for initiating localized ignition and flaming of a respective pair of fuel streams each having a centerline axis extending (102,106) sprayed from a selected pair of fuel spray orifices (90,94), said fuel ignition-initiating means (26) being adapted to be energized to an elevated temperature during engine operation chamber (18) and spaced a preselected distance ($L_1$) from the selected pair of fuel spray orifices (90,94) and also spaced between the centerline axes of the respective pair of fuel streams (102,106) sprayed during engine operation and projecting into the open combustion; and baffle means (30) for intercepting a preselected portion (34,38) of each of the respective pair of fuel streams (102,106), for temporarily maintaining in cooperation with the respective pair of fuel streams (102,106) those intercepted portions (34,38) of fuel within ignitable proximity to the fuel ignition-initiating means (26) in order to start an initially-localized flame (42) of burning fuel, and for controlledly reflecting and directing the resultant expanding flame (42) of burning fuel to all of the other fuel streams (110) so that they are interconnectedly bridged with the flame (42) and thereby ignited.

4. A fuel combustion system (10) for a direct-injection internal combustion engine (14) including a substantially guiescent open combustion chamber (18) adapted during engine operation to be periodically filled with intake air (74) and be substantially free of ordered motion of the intake air (74), a fuel injector (22) having at least three fuel spray orifices (90,94,98) projecting directly into a central portion of the open combustion chamber (18) and adapted during engine operation to simultaneously spray distinct and mutually-spaced conical fuel streams each having a centerline axis extending (102,106,110) generally radially outwardly towards peripheral portions of the open combustion chamber (18), comprising:

fuel ignition-initiating means (26) for initiating localized ignition and flaming of a respective pair of adjacent fuel streams (102,106) sprayed from a selected pair of adjacent fuel spray orifices (90,94), said fuel ignition-initiating means (26) being adapted to be electrically energized to an elevated temperature during engine operation and projecting directly into the open combustion chamber (18) and unobstructively spaced a preselected distance ($L_1$) from the selected pair of adjacent fuel spray orifices (90,94) and also spaced between the centerline axes of the respective pair of adjacent fuel streams (102,106) sprayed during engine operation; and baffle means (30) for intercepting only a stoichiometric preselected portion (34,38) of each of the respective pair of adjacent fuel streams (102,106), for temporarily maintaining, in cooperation with the respective pair of adjacent fuel streams (102,106), those intercepted portions (34,38) of fuel within ignitable proximity to the fuel ignition-initiating means (26) in order to positively start an initially localized flame (42) of burning fuel, and for controlledly reflecting and directing the resultant expanding flame (42) of burning fuel to all of the other fuel streams (110) so that they are interconnectedly bridged with the flame (42) and thereby positively ignited.

5. The fuel combustion system (10) of claim 2 wherein the baffle (138) has a generally tubular shape and a beveled end portion (142) inside which the concave surface (146) is positioned, said beveled end portion (142) positioned in spaced relation partially around the fuel ignition-initiating means with the beveled end portion (142) defining an opening (150) which exposes the concave surface (146) of the baffle (138) generally towards both the selected fuel spray orifice (90) and all of the pathways of the other fuel streams (106,110) sprayed from the other fuel spray orifices (94,98).

6. The fuel combustion system (10) of claim 5 further including an adapter (118) connected directly to the fuel ignition-initiating means (26) wherein the baffle (138) is connected to and forms an extension of the adapter (118) and projects directly into the open combustion chamber (18).

7. The fuel combustion system (10) of claim 5 wherein the baffle (138) is connected to the fuel ignition-initiating means (26) and projects directly into the open combustion chamber (18).

8. The fuel combustion system of claim 1 wherein the fuel ignition-initiating means is an electrically-energizable glow plug and the baffle means is further provided for partially shielding the glow plug from being cooled during engine operation by the motion of gases in the open combustion chamber.

9. The fuel combustion system (10) of claim 3 wherein the baffle means (30) is a baffle (138) positioned in the open combustion chamber (18) and having a generally concave and imperforate surface (146) generally facing and spaced from the selected pair of adjacent fuel spray orifices (90,94) according to a second preselected distance ($L_2$) which is greater than the first preselected distance ($L_1$) with the fuel ignition-initiating means (26) being positioned in spaced relation generally between the selected pair of adjacent fuel spray orifices (90,94) of the fuel injector (22) and the concave surface (146) of the baffle (138).

10. The fuel combustion system (10) of claim 9 wherein the baffle (138) has a generally tubular shape and a beveled end portion (142) inside which the concave surface (146) is positioned, said beveled end portion (142) positioned in generally spaced relation partially around the fuel ignition-initiating means (26) with the beveled end portion (142) defining only a single opening (150) which unobstructively exposes the concave surface (146) of the baffle (138) generally towards both the selected pair of fuel spray orifices (90,94) of the fuel injector (22) and all of the pathways of the other fuel streams (110) sprayed from the fuel injector (22).

11. The fuel combustion system (10) of claim 10 further including an adapter (118) connected directly to the fuel ignition-initiating means (26) wherein the baffle (138) is connected to and form an extension of the adapter (118) and projects directly into the open combustion chamber (18).

12. The fuel combustion system (10) of claim 10 wherein the baffle (138) is connected to the fuel ignition-initiating means (26) and projects directly into the open combustion chamber (18).

13. The fuel combustion system (10) of claim 9 wherein the concave surface (146) of the baffle (138) intercepts the pathway of the preselected portion (34,38) of each of the respective pair of fuel streams (102,106) sprayed during engine operation and deflects both preselected portions (34,38) to intercept one another in the space between the concave surface (146), the fuel ignition-initiating means (26), and the respective pair of fuel streams (102,106).

14. The fuel combustion system (10) of claim 3 wherein the preselected portion (34,38) of each respective fuel stream (102,106) intercepted by the baffle means (30) is less than one half of the total stoichiometric volume of air/fuel mixture of each of the selected pair of adjacent fuel streams (102,106) sprayed from the selected pair of fuel spray orifices (90,94).

15. The fuel combustion system (10) of claim 3 wherein the fuel ignition-initiating means (26) is an electrically-energizable glow plug (114).

16. The fuel combustion system (10) of claim 15 wherein the baffle means (30) is further provided for partially shielding the glow plug (114) from being cooled during engine operation by the motion of gases (74) in the open combustion chamber (18).

17. The fuel combustion system (10) of claim 4 wherein the baffle means (30) is a rigid baffle (138) positioned in the open combustion chamber (18) and having a generally concave and imperforate surface (146) generally facing and spaced from the selected pair of adjacent fuel spray orifices (90,94) according to a second preselected distance ($L_2$) which is greater than the first preselected distance ($L_1$) with the fuel ignition-initiating means (26) being positioned in spaced relation directly between the selected pair of adjacent fuel spray orifices (90,94) of the fuel injector (22) and the concave surface (146) of the baffle (138).

18. The fuel combustion system (10) of claim 17 wherein the baffle (138) has a generally tubular shape and a beveled end portion (142) inside which the concave surface (146) is positioned, said beveled end portion (142) positioned in generally concentrically spaced relation partially around the fuel ignition-initiating means (26) with the beveled end portion (142) defining only a single and generally oblong opening (150) which unobstructively exposes the concave surface (146) of the baffle (138) directly towards both the selected pair of fuel spray orifices (90,94) of the fuel injector (22) and all of the pathways of the other fuel streams (110) sprayed from the fuel injector (22).

19. The fuel combustion system of claim 1 wherein the open combustion chamber is defined by a bottom deck of a cylinder head, said baffle means being connected to the bottom deck.

20. The fuel combustion system of claim 1 wherein the fuel-ignition initiating means includes a glow plug having a body and an electrical resistance element, said baffle means being formed as an extension of the body and positioned in spaced relation partially around the electrical resistance element.

21. The fuel combustion system of claim 1 wherein the fuel-ignition initiating means includes a spark plug having a body and an electrode element, said baffle means being formed as an extension of the body and positioned in spaced relation partially around the electrode element.

* * * * *

UNITED STATES PATENT AND TRADEMARK OFFICE
CERTIFICATE OF CORRECTION

PATENT NO. : 4,721,081

DATED : January 26, 1988

INVENTOR(S) : Ziedonis I. Krauja, Jeffrey J. Krieger, Scott F. Shafer, and Craig A. Kroeger It is certified that error appears in the above-identified patent and that said Letters Patent is hereby corrected as shown below:

Claim 1, column 10, line 31, change "spray" to --sprayed--.

Claim 2, column 10, line 56, change "ignition" to --ignitable--.

Claim 3, column 11, line 13, after "streams", insert --each having a centerline axis extending--.

Claim 3, column 11, line 18, after "streams", delete "each having a centerline axis extending".

Claim 3, column 11, line 22, after "operation", insert --and projecting into the open combustion--.

Claim 3, column 11, lines 26-27, after "operation", delete "and projecting into the open combustion".

Claims 3-7 and 9-18, delete all reference numerals and reference letters.

Abstract, delete all reference numerals.

Signed and Sealed this

Third Day of January, 1989

Attest:

DONALD J. QUIGG

Attesting Officer

Commissioner of Patents and Trademarks